US008435008B2

(12) United States Patent
Hagan et al.

(10) Patent No.: US 8,435,008 B2
(45) Date of Patent: May 7, 2013

(54) TURBINE BLADE INCLUDING MISTAKE PROOF FEATURE

(75) Inventors: Benjamin F. Hagan, Manchester, CT (US); James P. Chrisikos, Vernon, CT (US); Jess J. Parkin, West Hartford, CT (US)

(73) Assignee: United Technologies Corporation, Hartford, CT (US)

(*) Notice: Subject to any disclaimer, the term of this patent is extended or adjusted under 35 U.S.C. 154(b) by 973 days.

(21) Appl. No.: 12/253,537

(22) Filed: Oct. 17, 2008

(65) Prior Publication Data

US 2010/0098547 A1 Apr. 22, 2010

(51) Int. Cl.

| | |
|---|---|
| ***B63H 1/26*** | (2006.01) |
| ***B63H 7/02*** | (2006.01) |
| ***B64C 27/46*** | (2006.01) |
| ***F03B 3/12*** | (2006.01) |
| ***F03B 7/00*** | (2006.01) |
| ***F03D 11/02*** | (2006.01) |
| ***F04D 29/38*** | (2006.01) |
| ***B64C 11/16*** | (2006.01) |
| ***F01D 5/14*** | (2006.01) |

(52) U.S. Cl.
USPC .................. 416/239; 416/219 R; 416/220 R; 416/248

(58) Field of Classification Search ........................ None
See application file for complete search history.

(56) References Cited

U.S. PATENT DOCUMENTS

| | | | | |
|---|---|---|---|---|
| 3,572,968 | A | 3/1971 | Musick et al. | |
| 4,257,742 | A | 3/1981 | Ogata et al. | |
| 4,401,411 | A | 8/1983 | Hisano et al. | |
| 4,784,573 | A | 11/1988 | Ress, Jr. | |
| 5,135,354 | A | 8/1992 | Novotny | |
| 5,228,835 | A * | 7/1993 | Chlus | 416/193 A |
| 5,281,097 | A * | 1/1994 | Wilson et al. | 416/193 A |
| 5,431,543 | A | 7/1995 | Brown et al. | |
| 5,827,047 | A * | 10/1998 | Gonsor et al. | 416/193 A |
| 6,171,058 | B1 * | 1/2001 | Stec | 416/193 A |
| 6,371,727 | B1 | 4/2002 | Stangeland et al. | |
| 6,951,447 | B2 | 10/2005 | Cherolis et al. | |
| 7,371,048 | B2 | 5/2008 | Downs et al. | |
| 7,374,400 | B2 | 5/2008 | Boswell | |
| 2007/0041838 | A1 * | 2/2007 | Charbonneau et al. | 416/193 A |

* cited by examiner

*Primary Examiner* — Julio J Maldonado
*Assistant Examiner* — Shantanu C Pathak
(74) *Attorney, Agent, or Firm* — Carlson, Gaskey & Olds, P.C.

(57) ABSTRACT

A turbine blade includes a platform, an airfoil located on one side of the platform, and a base located on an opposite side of the platform. The base includes an attachment portion that is receivable in a blade retention slot of a turbine disk and a shelf located outside the turbine disk. The shelf includes a mistake proof feature that projects from an outer surface of the shelf.

24 Claims, 7 Drawing Sheets

TURBINE BLADE INCLUDING MISTAKE PROOF FEATURE

BACKGROUND OF THE INVENTION

This application relates generally to a turbine blade including a mistake proof tab that prevents intermixing of different blade designs in a turbine disk of a turbine engine.

Gas turbine engines generally include a turbine disk and a plurality of removable turbine blades. The turbine blades should all have a similar blade design. Intermixing of blade designs can affect operation and/or reliability of the gas turbine engine.

FIG. 1 illustrates a prior art turbine blade 200. A platform 202 is provided at a radially inner portion of the turbine blade 200, and an airfoil 204 extends radially outwardly from the platform 202. A base 206 located under the platform 202 includes a shelf 208. A central longitudinal axis Y passes through a center of a width V of a bottom surface 222 of the base 206 of the turbine blade 200. A distance $X_1$ is defined between the central longitudinal axis Y of the base 206 and an outer surface 210 of the shelf 208 on a suction side 212 of the turbine blade 200, and a distance $X_2$ is defined between the central longitudinal axis Y of the base 206 and an outer surface 218 of the shelf 208 on an opposing pressure side 220 of the turbine blade 200. The distance $X_1$ and the distance $X_2$ are substantially equal and together define a width of the turbine blade 200.

As shown in FIG. 2, an attachment portion 214 of the base 206 of the turbine blade 200 is received in a blade retention slot 54 of a turbine disk 46. The shelves 208 of the turbine blades 200 are located outside the turbine disk 46 and are separated by a space 216. The prior art turbine blade 200 does not include any features that would distinguish the prior art turbine blade 200 from a turbine blade having a different design.

There is a need in the art for a turbine blade that includes a mistake proof feature that prevents intermixing of turbine blade designs in a turbine disk of a turbine engine.

SUMMARY OF THE INVENTION

A turbine blade includes a platform, an airfoil located on one side of the platform, and a base located on an opposite side of the platform. The base includes an attachment portion that is receivable in a blade retention slot of a turbine disk and a shelf located outside the turbine disk. The shelf includes a mistake proof feature that projects from an outer surface of the shelf.

In another example, a turbine assembly includes a turbine disk including a plurality of blade retention slots and a plurality of turbine blades. One turbine blade is received in each of the blade retention slots. Each of the plurality of turbine blades includes a platform, an airfoil located on one side of the platform, and a base located on an opposite side of the platform. The base includes an attachment portion that is receivable in one of the blade retention slots of the turbine disk and a shelf located outside the turbine disk. The shelf includes a mistake proof feature that projects from an outer surface of the shelf. A space is defined between the mistake proof feature of each of the turbine blades and an outer surface of the shelf of an adjacent turbine blade.

These and other features of the present invention can be best understood from the following specification and drawings, the following of which is a brief description.

DETAILED DESCRIPTION OF THE PREFERRED EMBODIMENT

Figure 1:
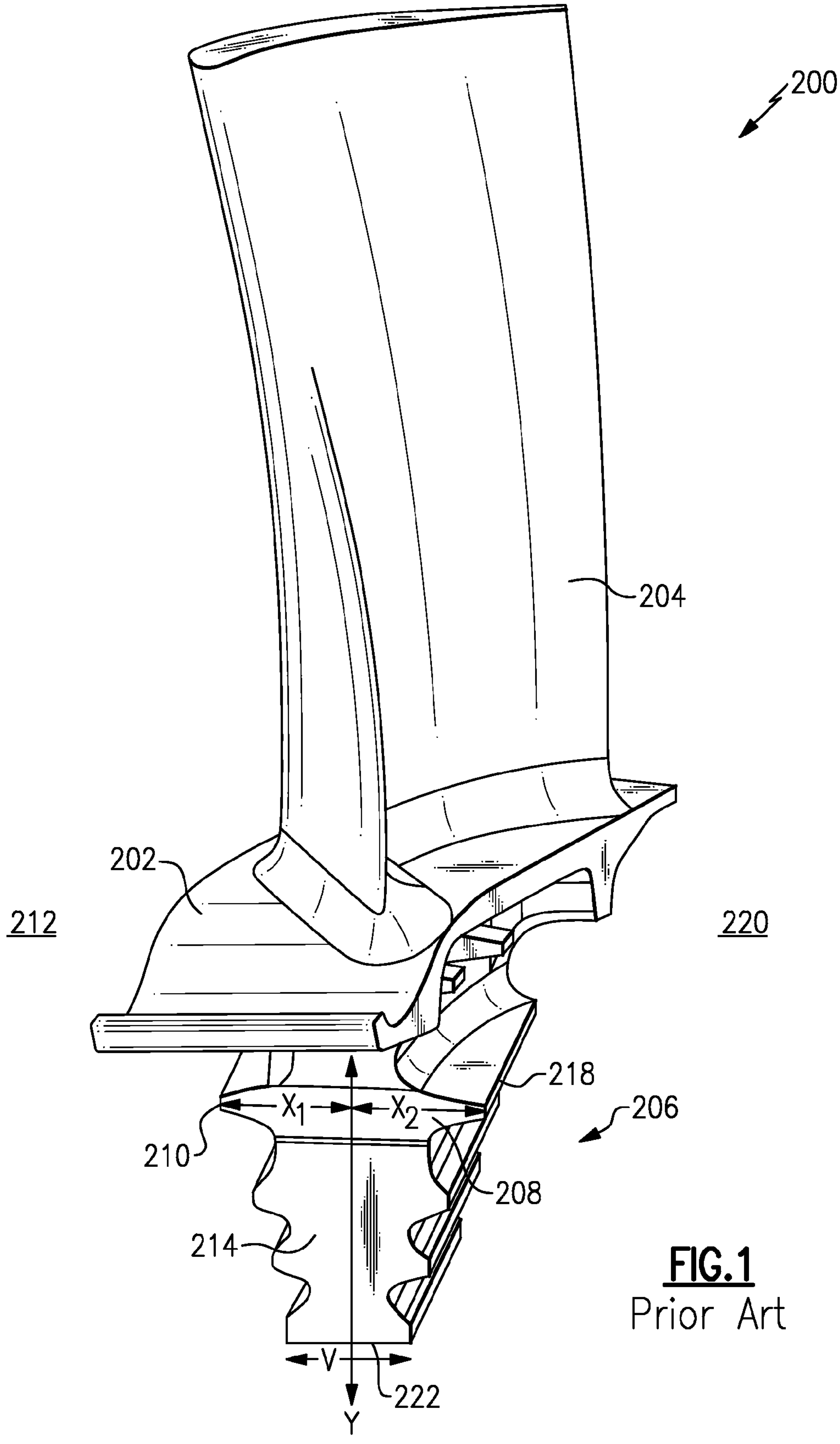
FIG.1 Prior Art
FIG. 1 illustrates a perspective view of a prior art turbine blade.
Figure 2:
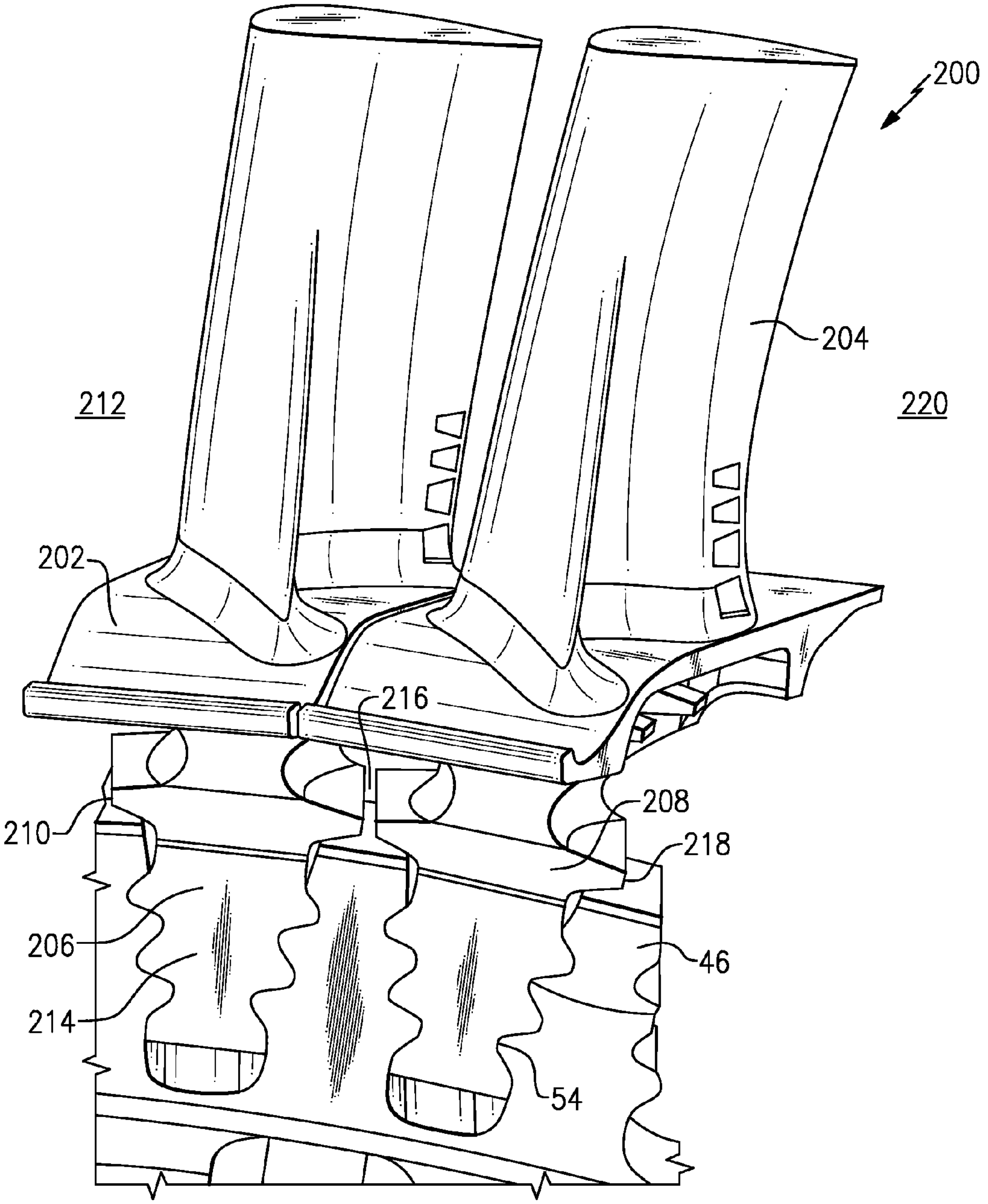
FIG.2 Prior Art
FIG. 2 illustrates a side view of the prior art turbine blade attached to a turbine disk.
Figure 3:
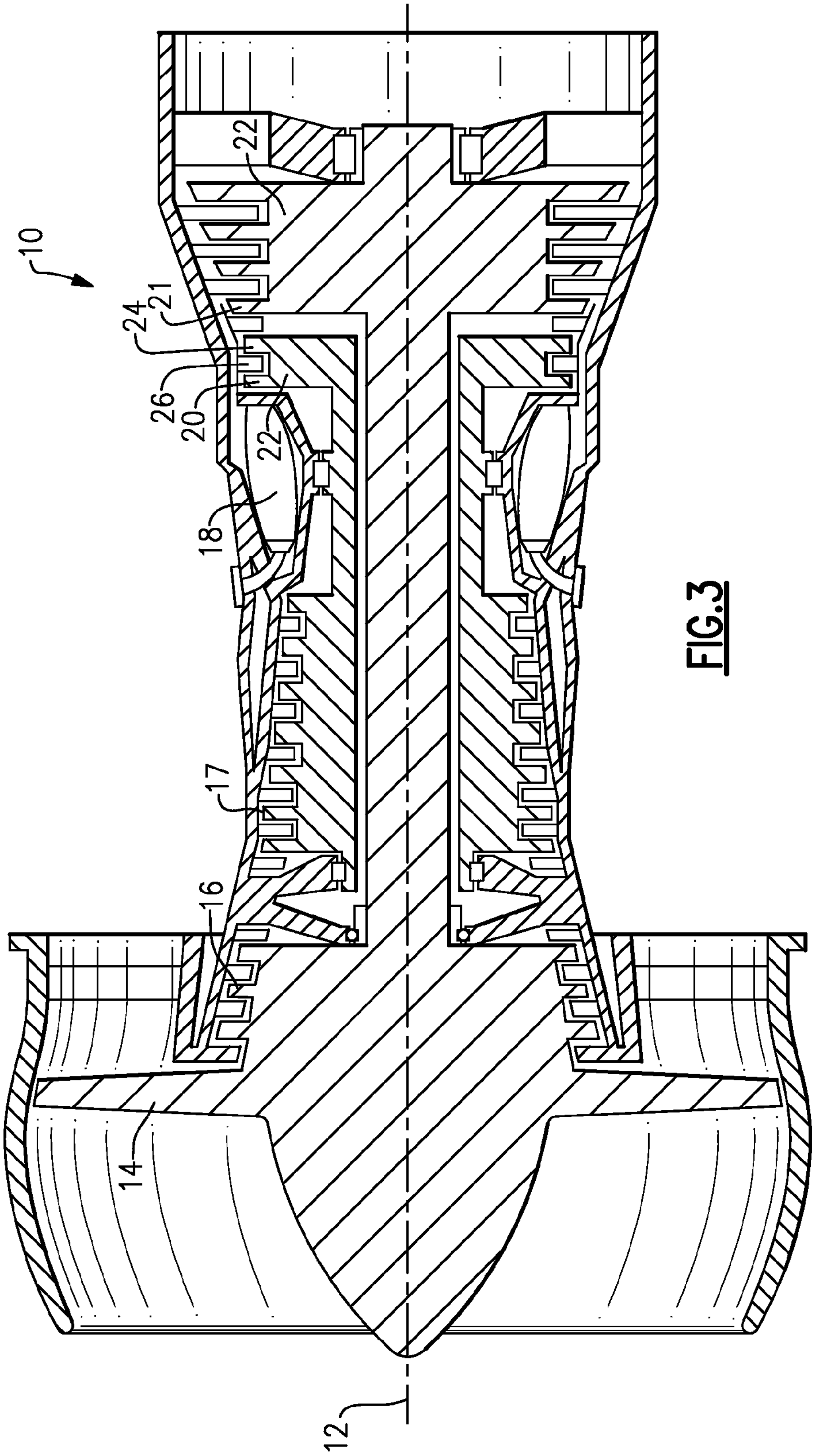
FIG. 3 illustrates a simplified cross-sectional view of a standard gas turbine engine.

As shown in FIG. 3, a gas turbine engine 10, such as a turbofan gas turbine engine, is circumferentially disposed about an engine centerline (or axial centerline axis 12). The gas turbine engine 10 includes a fan 14, compressors 16 and 17, a combustion section 18 and turbines 20 and 21. This application extends to engines without a fan, and with more or fewer sections. As is well known in the art, air is compressed in the compressors 16 and 17, mixed with fuel and burned in the combustion section 18, and expanded in turbines 20 and 21. The turbines 20 and 21 include rotors 22 which rotate in response to the expansion, driving the compressors 16 and 17 and the fan 14. The turbines 20 and 21 include alternating rows of rotating airfoils or turbine blades 24 and static airfoils or vanes 26.

FIG. 3 is schematic, and the turbine blades 24 and the vanes 26 are removable from the rotors 22 in this example. It should be understood that this view is included simply to provide a basic understanding of the sections in a gas turbine engine 10 and not to limit the invention. This invention extends to all types of gas turbine engines for all types of applications.

Figure 4:
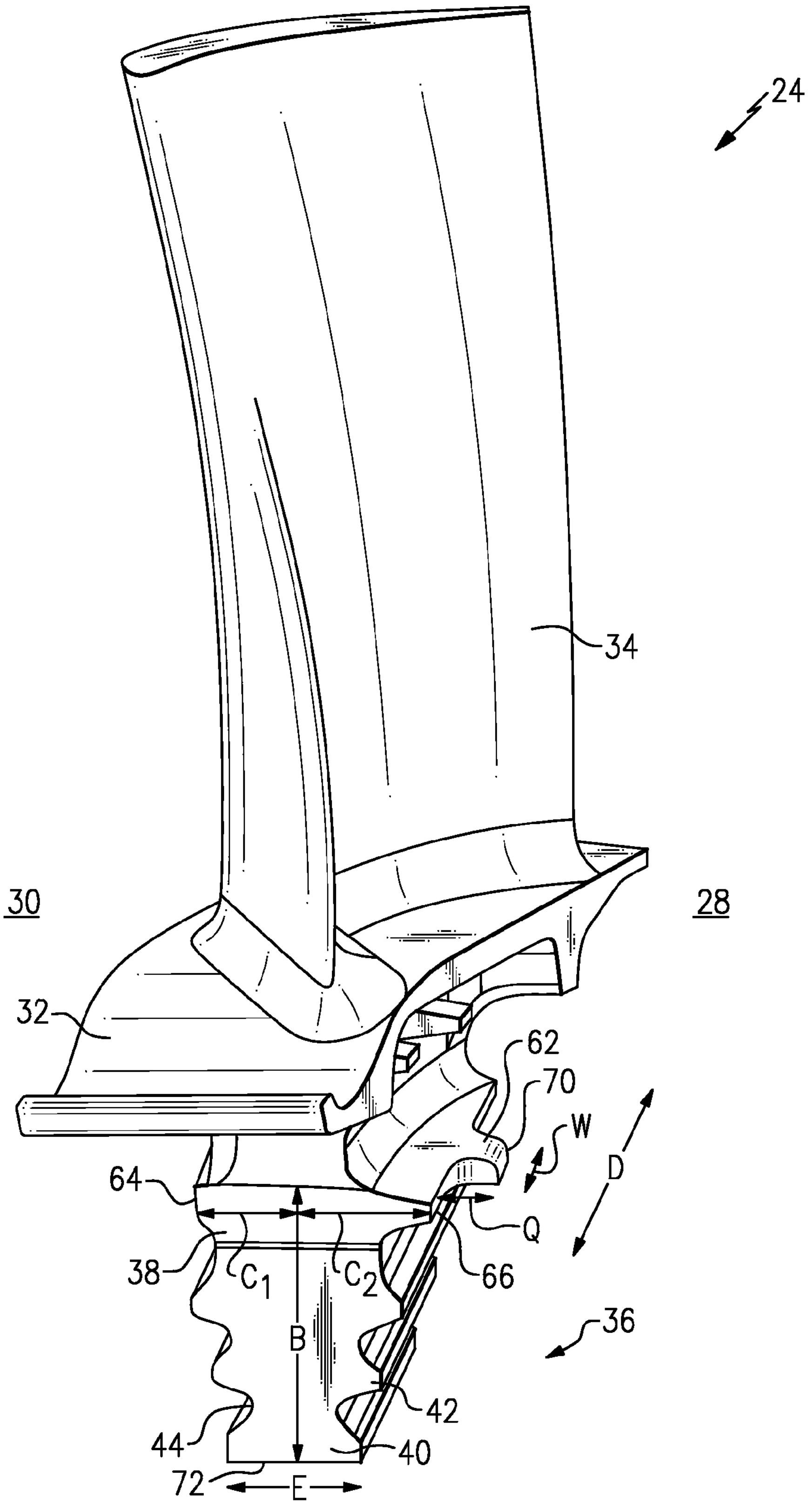
FIG. 4 illustrates a perspective view of a turbine blade.

FIG. 4 illustrates the turbine blade 24 having a pressure side 28 and a suction side 30. A platform 32 is provided at a radially inner portion of the turbine blade 24, and an airfoil 34 extends radially outwardly from the platform 32 (as seen from the axial centerline axis 12). A base 36 is located under the platform 32. The base 36 includes a shelf 38 and an attachment portion 40 having an irregular surface including fingers 42 and grooves 44. The shelf 38 is located above the attachment portion 40 and below the platform 32.

A central longitudinal axis B passes through a center of a width E of a bottom surface 72 of the base 36 of the turbine blade 24. A distance $C_1$ is defined between the central longitudinal axis B and an outer surface 64 of the shelf 38 on the suction side 30 of the turbine blade 24, and a distance $C_2$ is defined between the central longitudinal axis B and an outer surface 66 of the shelf 38 on the pressure side 28 of the turbine blade 24. The distance $C_1$ is less than the distance $C_2$ and less than the distance $X_1$ of the prior art turbine blade 200. The distance $C_1$ and the distance $C_2$ together define a width of the turbine blade 24. In one example, the shelf 38 on the suction side 30 includes a cutback or trimmed back portion to prevent interference with an adjacent turbine blade, as described below. The shape and distance $C_2$ of the shelf 38 on the suction side 30 of the turbine blade 24 can be formed or defined by casting, machining or casting with further machining.

The shelf 38 also has a depth D defined between a front and a back of the base 36, and the fingers 42 and the grooves 44 extend along the depth D. The depth D is substantially perpendicular to the central longitudinal axis B.

Figure 5:
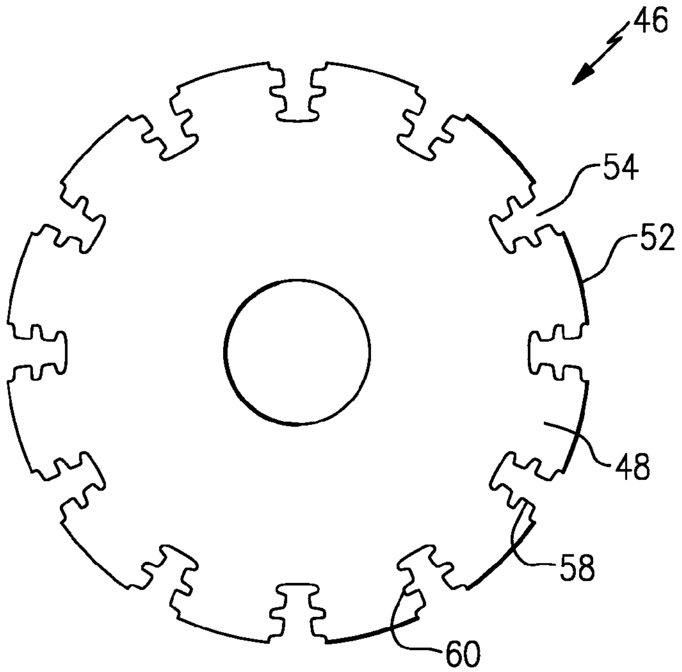
FIG. 5 illustrates a front view of the turbine disk.
Figure 6:
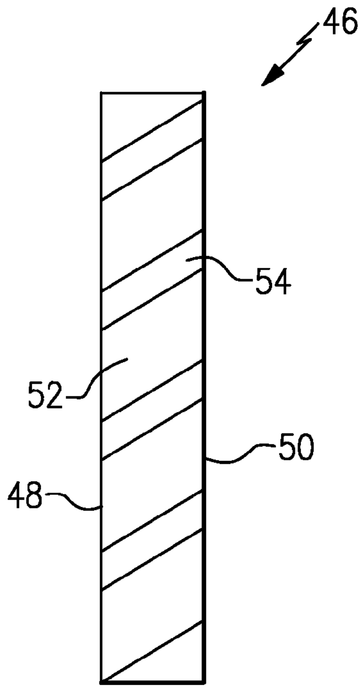
FIG. 6 illustrates a side view of the turbine disk.

As shown in FIGS. 5 and 6, the turbine disk 46 includes a first face 48, an opposing second face 50, and an outer perimeter surface 52 that extends axially between the first face 48 and the opposing second face 50. A plurality of blade retention slots 54 extend through the turbine disk 46 from the first face 48 and the opposing second face 50.

The blade retention slots 54 have a profile that is complementary to the profile of the base 36 of the turbine blade 24. When the turbine blade 24 is to be installed in the turbine disk 46, the attachment portion 40 of the base 36 of the turbine blade 24 is aligned with one of the blade retention slots 54. The fingers 42 of the turbine blade 24 align with grooves 60 of the blade retention slot 54, and the grooves 44 of the turbine blade 24 align with fingers 58 of the blade retention slot 54. The turbine blade 24 is then slid relative to the turbine disk 46 to receive the turbine blade 24 in the blade retention slot 54. The shelf 38 is located outside the outer perimeter surface 52 of the turbine disk 46. Each blade retention slot 54 receives the base 36 of one of the turbine blades 24.

Returning to FIG. 4, the turbine blade 24 includes a tab 62 located on the outer surface 66 of the shelf 38 on the pressure side 28 of the turbine blade 24 in this example. The tab 62 is located substantially in a center of the depth D of the shelf 38. Locating the tab 62 in the center of the depth D of the shelf 38 reduces impact on blade stress, balance and rotor life. In one example, the tab 62 has a depth W that is less than the depth D of the shelf 38. However, the tab 62 can have a depth W that is equal to the depth D of the shelf 38.

The tab 62 extends substantially perpendicular to the outer surface 66 of the shelf 38. The tab 62 also has a width Q defined between the outer surface 66 of the shelf 38 and an outer surface 70 of the tab 62, the outer surfaces 66 and 70 being substantially parallel. Although the tab 62 is disclosed as being located on the pressure side 28 of the turbine blade 24, it is to be understood that the tab 62 could also be located on the suction side 30 of the turbine blade 24.

The tab 62 can be formed during casting of the turbine blade 24 to provide a visual and measurable feature on the turbine blade 24 during manufacture and assembly of the turbine blade 24. Once cast, the tab 62 can be machined to further define the shape of the tab 62. The tab 62 prevents the turbine blade 24 from being mistakenly assembled with, or confused for, the prior art turbine blade 200 during machining and assembly. Mixing the turbine blade 24 and the prior art turbine blade 200 can cause vibrations in the turbine engine 10. The tab 62 provides a low stress and balance-neutral approach to preventing misassembled turbine blades 24.

Figure 7:
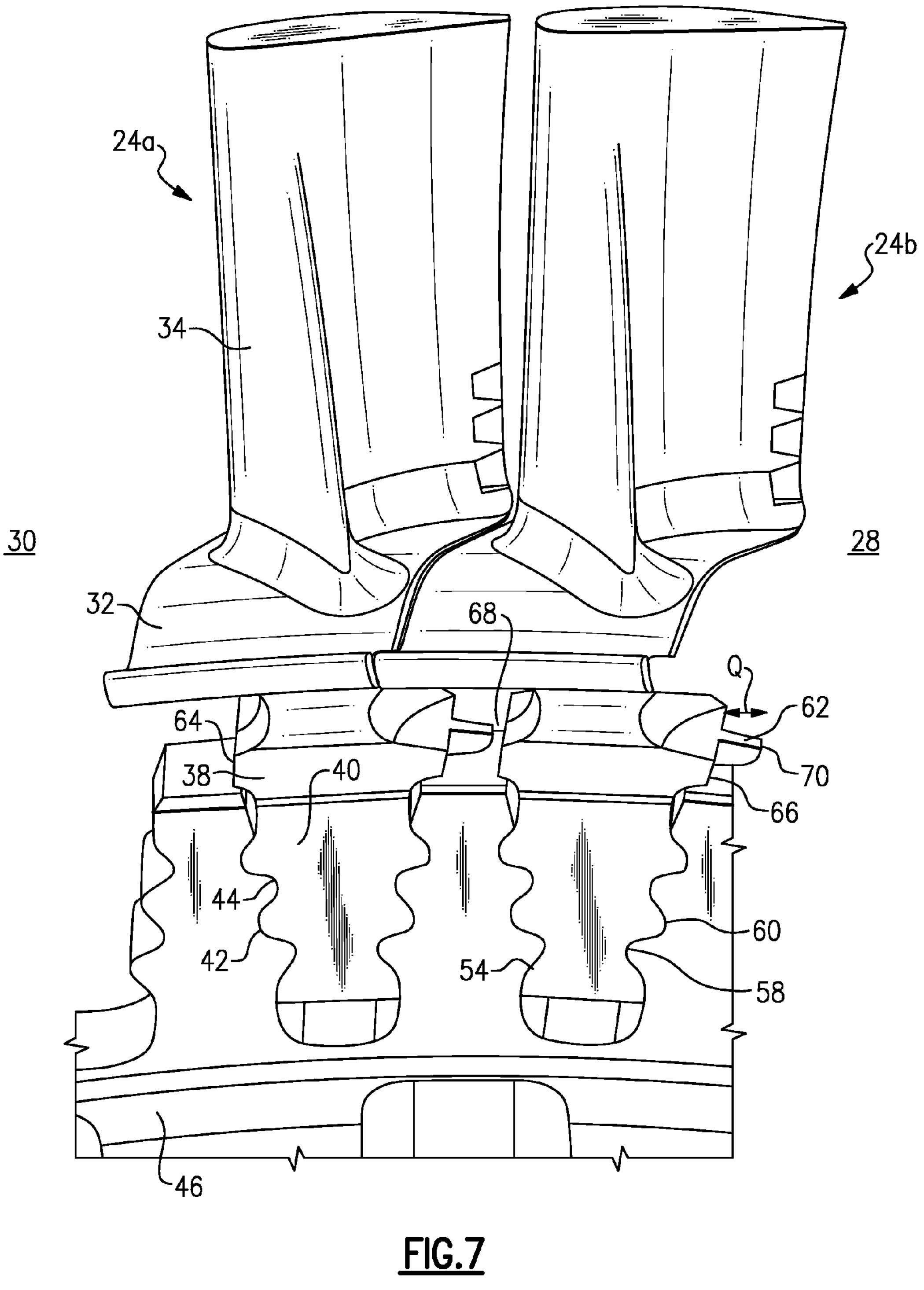
FIG. 7 illustrates the turbine blade of FIG. 4 attached to the turbine disk.

As shown in FIG. 7, when two turbine blades 24*a* and 24*b* are located in adjacent blade retention slots 54 of the turbine disk 46, a space 68 is defined between the outer surface 70 of the tab 62 of the turbine blade 24*a* and the outer surface 64 of the shelf 38 of the turbine blade 24*b*, providing a proper clearance or space 68 between the adjacent turbine blades 24*a* and 24*b*. As the distance $C_1$ of the suction side 30 of the shelf 38 is reduced, the tab 62 of the turbine blade 24*a* does not engage or contact the outer surface 64 of the shelf 38 of the turbine blade 24*b*, allowing insertion of both the turbine blades 24*a* and 24*b* in the turbine disk 46.

When two turbine blades 24*a* and 24*b* are located in adjacent blade retention slots 54*a* and 54*b*, respectively, of the turbine disk 46, the tab 62 of the turbine blade 24*a* of the turbine blade 24*a* faces the outer surface 64 of the shelf 38 of the turbine blade 24*b*. As the shelf 38 located on the suction side 30 of the turbine blade 24*b* has a reduced distance $C_1$ (due to the cut back or trimmed back portion), as compared to the distance $X_1$ of the prior art turbine blades 200*a* and 200*b*, the tab 62 does not hinder installation of the turbine blades 24*a* and 24*b* as a space 68 is defined between the outer surface 70 of the tab 62 and the outer surface 64 of the shelf 38, maintaining proper clearances between the turbine blades 24. The tab 62 of the turbine blades 24*a* and 24*b* prevents inadvertent installation of both the prior art turbine blades 200*a* and 200*b* and the turbine blades 24*a* and 24*b* in the same turbine disk 46.

Figure 8:
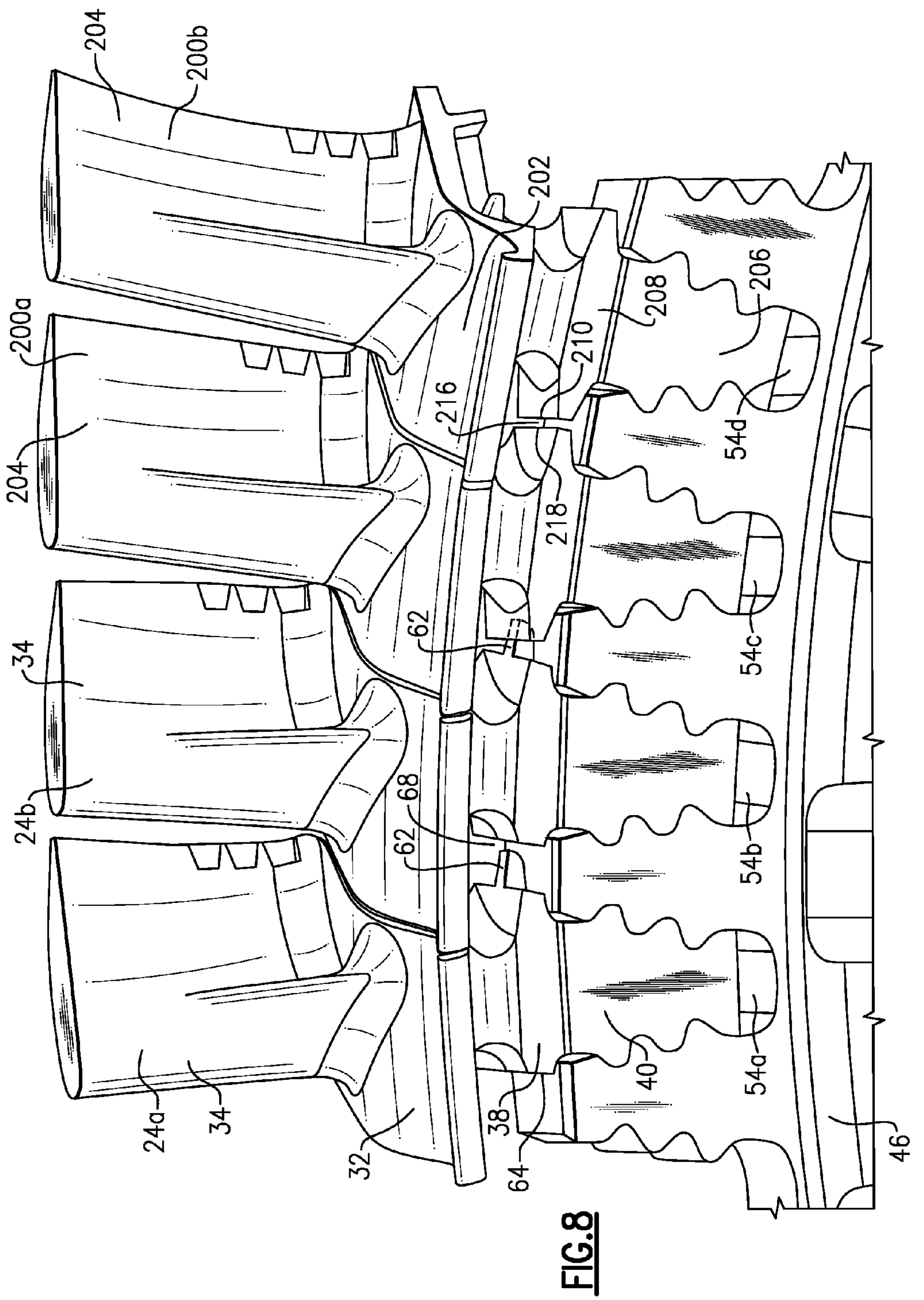
FIG. 8 illustrates the prior art turbine blade of FIG. 1 and the turbine blade of FIG. 4 attached to a turbine disk.

As shown in FIG. 8, when two prior art turbine blade 200*a* and 200*b* are located in adjacent blade retention slots 54*c* and 54*d*, respectively, of the turbine disk 46, a space 216 is defined between the outer surface 218 of the shelf 208 of one prior art turbine blade 200*a* and the outer surface 210 of the shelf 208 of the adjacent prior art turbine blade 200*b*, providing a space 216 with a proper clearance between the adjacent turbine blades 200*a* and 200*b*.

In one example, the turbine blades 24*a* and 24*b* are installed in the blade retention slots 54*a* and 54*b*, respectively, of the turbine disk 46. If the prior art turbine blade 200*a* is attempted to be installed in the blade retention slot 54*c*, the tab 62 prevents insertion of the turbine blade 200*a* into the adjacent blade retention slot 54*c*. The shelf 208 of the turbine blade 200*a* (which has a distance $X_1$ between the outer surface 210 of the shelf 208 and the central longitudinal axis Y that is greater than the distance $C_1$ between the outer surface 64 of the shelf 38 of the turbine blade 24 and the longitudinal central axis B) contacts the tab 62, preventing insertion of the prior art turbine blade 200 in the blade retention slot 54*c* of the turbine disk 46. In this example, only turbine blades 24*a* and 24*b* can be installed in the turbine disk 46, maintaining proper clearances between the turbine blades 24*a* and 24*b*.

In another example, the prior art turbine blades 200*a* and 200*b* are installed into the blade retention slots 54*c* and 54*d*, respectively, of the turbine disk 46. If a turbine blade 24*b* is attempted to be installed in the blade retention slot 54*b*, the shelf 208 (which has a distance $X_1$ between the outer surface 210 of the shelf 208 and the central longitudinal axis Y that is greater than the distance $C_1$ between the outer surface 64 of the shelf 38 of the turbine blade 24 and the longitudinal central axis B of the turbine blade 24*b*) prevents insertion of the turbine blade 24*b* into the adjacent blade retention slot 54*b*. That is, the tab 62 of the turbine blade 24*b* contacts the shelf 208 of the prior art turbine blade 200*a*, preventing insertion of the turbine blade 24*b* into the blade retention slot 54*b*. In this example, only turbine blades 200*a* and 200*b* can be installed in the turbine disk 46, maintaining proper clearances between the turbine blades 200*a* and 200*b*.

Although FIG. 8 shows the turbine blade 24*b* installed next to the turbine blade 200*a*, this is not possible due to the width Q of the tab 62 of the turbine blade 24*b* and the distance $X_1$ between the outer surface 210 of the shelf 208 and the central longitudinal axis Y of the prior art turbine blade 200*a*. As shown in FIG. 8, a portion of the tab 62 of the turbine blade 24*b* is shown in phantom lines to illustrate the interference of the tab 62 relative to the outer surface 210 of the shelf 208 of the prior art turbine blade 200*a*. As the outer surface 210 of the shelf 208 and the tab 62 occupy the same space, the turbine blade 200*a* and the turbine blade 24*b* cannot be installed next to each other.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A turbine blade comprising:

a platform;

an airfoil located on one side of the platform; and a base located on an opposing side of the platform, the base including an attachment portion that is receivable in a blade retention slot of a turbine disk and a shelf to be located outside the turbine disk, wherein the turbine blade includes a pressure side and an opposing suction side, and a mistake proof feature projects from a first outer surface of the shelf on one of the pressure side and the opposing suction side, wherein the mistake proof feature provides for proper installation of an adjacent turbine blade having an adjacent shelf, and a space is defined between the mistake proof feature and the adjacent shelf of the adjacent turbine blade, wherein a central longitudinal axis passes through a center of a width of a bottom surface of the base, wherein a distance between an opposing second outer surface of the shelf and the central longitudinal axis is less than a distance between the first outer surface and the central longitudinal axis.

2. The turbine blade as recited in claim 1 wherein the mistake proof feature is located on the pressure side of the shelf of the turbine blade.

3. The turbine blade as recited in claim 1 wherein the shelf has a depth extending from a front surface to a rear surface of the base and the mistake proof feature has a depth, wherein the depth of the mistake proof feature is less than the depth of the shelf.

4. A turbine blade comprising:

a platform;

an airfoil located on one side of the platform: and a base located on an opposing side of the platform, the base including an attachment portion that is receivable in a blade retention slot of a turbine disk and a shelf to be located outside the turbine disk, wherein the turbine blade includes a pressure side and an opposing suction side, and a mistake proof feature projects from a first outer surface of the shelf on one of the pressure side and the opposing suction side, wherein the mistake proof feature provides for proper installation of an adjacent turbine blade having an adjacent shelf, a space is defined between the mistake proof feature and the adjacent shelf of the adjacent turbine blade, the shelf has a depth extending from a front surface to a rear surface of the base and the mistake proof feature has a depth, wherein the depth of the mistake proof feature is less than the depth of the shelf, and the mistake proof feature is centered relative to the depth of the shelf.

5. The turbine blade as recited in claim 1 wherein the mistake proof feature is a tab.

6. A turbine blade comprising:

a platform;

an airfoil located on one side of the platform; and a base located on an opposing side of the platform, the base including an attachment portion that is receivable in a blade retention slot of a turbine disk and a shelf to be located outside the turbine disk, wherein the turbine blade includes a pressure side and an opposing suction side, and a mistake proof feature projects from a first outer surface of the shelf on one of the pressure side and the opposing suction side, wherein the mistake proof feature provides for proper installation of an adjacent turbine blade having an adjacent shelf, a space is defined between the mistake proof feature and the adjacent shelf of the adjacent turbine blade, and the mistake proof feature extends substantially perpendicular to the first outer surface of the shelf.

7. The turbine blade as recited in claim 1 wherein the attachment portion of the base includes a plurality of grooves and a plurality of fingers.

8. The turbine blade as recited in claim 1 wherein the first outer surface is located on the pressure side of the turbine blade and the opposing second outer surface is located on the opposing suction side of the turbine blade.

9. A turbine assembly comprising:

a turbine disk including a plurality of blade retention slots; and a plurality of turbine blades, wherein one of the plurality of turbine blades is received in each of the plurality of blade retention slots, and each of the plurality of turbine blades includes a platform, an airfoil located on one side of the platform, and a base located on an opposing side of the platform, the base including an attachment portion that is receivable in one of the plurality of blade retention slots of the turbine disk and a shelf located outside the turbine disk, wherein the turbine blade includes a pressure side and an opposing suction side, and a mistake proof feature projects from a first outer surface of the shelf on one of the pressure side and the opposing suction side, wherein a space is defined between the mistake proof feature of each of the plurality of turbine blades and an opposing second outer surface of the shelf of an adjacent one of the plurality of turbine blades, and wherein a central longitudinal axis passes through a center of a width of a bottom surface of the base, wherein a distance between the opposing second outer surface of the shelf and the central longitudinal axis is less than a distance between the first outer surface and the central longitudinal axis.

10. The turbine assembly as recited in claim 9 wherein the mistake proof feature is located on the pressure side of the shelf of each of the plurality of turbine blades.

11. The turbine assembly as recited in claim 9 wherein the shelf has a depth extending from a front surface to a rear surface of the base and the mistake proof feature has a depth, wherein the depth of the mistake proof feature is less than the depth of the shelf.

12. A turbine assembly comprising:

a turbine disk including a plurality of blade retention slots; and a plurality of turbine blades, wherein one of the plurality of turbine blades is received in each of the plurality of blade retention slots, and each of the plurality of turbine blades includes a platform. an airfoil located on one side of the platform, and a base located on an opposing side of the platform. the base including an attachment portion that is receivable in one of the plurality of blade retention slots of the turbine disk and a shelf located outside the turbine disk, wherein the turbine blade includes a pressure side and an opposing suction side, and a mistake proof feature projects from a first outer surface of the shelf on one of the pressure side and the opposing suction side, wherein a space is defined between the mistake proof feature of each of the plurality of turbine blades and an opposing second outer surface of the shelf of an adjacent one of the plurality of turbine blades, the shelf has a depth extending from a front surface to a rear surface of the base and the mistake proof feature has a depth, wherein the depth of the mistake proof feature is less than the depth of the shelf, and the mistake proof feature is centered relative to the depth of the shelf.

13. The turbine assembly as recited in claim 9 wherein the mistake proof feature is a tab.

14. A turbine assembly comprising:

a turbine disk including a plurality of blade retention slots; and a plurality of turbine blades, wherein one of the plurality of turbine blades is received in each of the plurality of blade retention slots and each of the plurality of turbine blades includes a platform, an airfoil located on one side of the platform, and a base located on an opposing side of the platform, the base including an attachment portion that is receivable in one of the plurality of blade retention slots of the turbine disk and a shelf located outside the turbine disk, wherein the turbine blade includes a pressure side and an opposing suction side, and a mistake proof feature projects from a first outer surface of the shelf on one of the pressure side and the opposing suction side, wherein a space is defined between the mistake proof feature of each of the plurality of turbine blades and an opposing second outer surface of the shelf of an adjacent one of the plurality of turbine blades, and the mistake proof feature extends substantially perpendicular to the first outer surface of the shelf.

15. The turbine blade as recited in claim 9 wherein the attachment portion of the base includes a plurality of grooves and a plurality of fingers.

16. The turbine assembly as recited in claim 9 wherein the first outer surface is located on the pressure side of the turbine blade and the opposing second outer surface is located on the opposing suction side of the turbine blade.

17. The turbine blade as recited in claim 1 wherein the mistake proof feature is cast with the turbine blade.

18. The turbine blade as recited in claim 17 wherein the mistake proof feature is machined.

19. The turbine blade as recited in claim 1 wherein the mistake proof feature is integral with the turbine blade to define a single component.

20. The turbine assembly as recited in claim 9 wherein the mistake proof feature is cast with each of the plurality of turbine blades.

21. The turbine assembly as recited in claim 20 wherein the mistake proof feature of each of the plurality of turbine blades is machined.

22. The turbine assembly as recited in claim 9 wherein the mistake proof feature of each of the plurality of turbine blades is integral with the turbine blade to define a single component.

23. The turbine blade as recited in claim 1 wherein an entirety of the mistake proof feature has a height, the space is defined between the mistake proof feature and the adjacent shelf of the adjacent turbine blade, and the space has the height.

24. The turbine assembly as recited in claim 9 wherein an entirety of the mistake proof feature has a height, the space is defined between the mistake proof feature and the adjacent shelf of the adjacent turbine blade, and the space has the height.

* * * * *